(12) United States Patent
Ishimoto

(10) Patent No.: US 8,031,568 B2
(45) Date of Patent: Oct. 4, 2011

(54) DISK DEVICE AND DISK DRIVE CONTROLLING METHOD

(75) Inventor: Tsutomu Ishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 12/606,555

(22) Filed: Oct. 27, 2009

(65) Prior Publication Data

US 2010/0142339 A1 Jun. 10, 2010

(30) Foreign Application Priority Data

Dec. 5, 2008 (JP) ................................. 2008-311641

(51) Int. Cl.
*G11B 20/00* (2006.01)
(52) U.S. Cl. .................. 369/47.15; 369/47.45
(58) Field of Classification Search .................. None
See application file for complete search history.

(56) References Cited

U.S. PATENT DOCUMENTS 4,809,248 A * 2/1989 Sengoku ...................... 369/53.3
7,136,339 B2 * 11/2006 Kubota et al. ................ 369/53.29
2003/0174614 A1 * 9/2003 Tateishi et al. ............... 369/53.3
2008/0192593 A1 * 8/2008 Lin ............................... 369/47.4

FOREIGN PATENT DOCUMENTS

| JP | 2006-313589 | 11/2006 |
| JP | 2008-165840 | 7/2008 |

* cited by examiner

*Primary Examiner* — Christopher Lamb
(74) *Attorney, Agent, or Firm* — Oblon, Spivak, McClelland, Maier & Neustadt, L.L.P.

(57) ABSTRACT

A disk device includes a main control unit controlling the operation of a controlled object on the basis of an error signal calculated from a target signal of the controlled object and an observation signal of the controlled object, a repetitive control unit sampling the error signal with a sampling clock pulse to obtain a repetitive signal component generated in synchronization with rotation of the disk medium from the sampled error signal, a sampling clock generation unit generating the sampling clock pulse and resetting a timing at which the sampling clock pulse is generated in accordance with a rotation detecting pulse and a sampling clock limit unit limiting generation of the sampling clock pulse at a timing immediately before generation of the rotation detecting pulse.

6 Claims, 12 Drawing Sheets

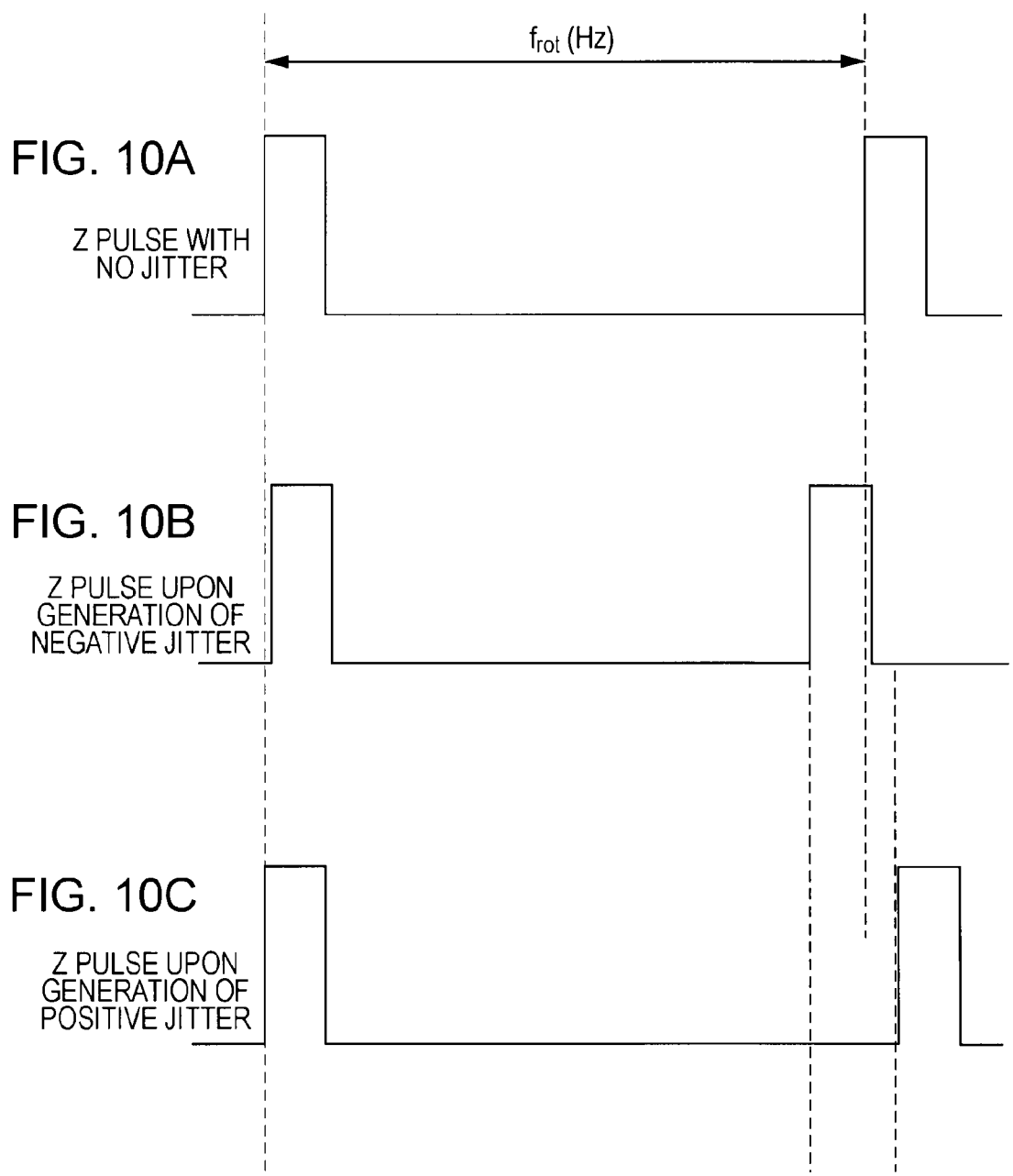

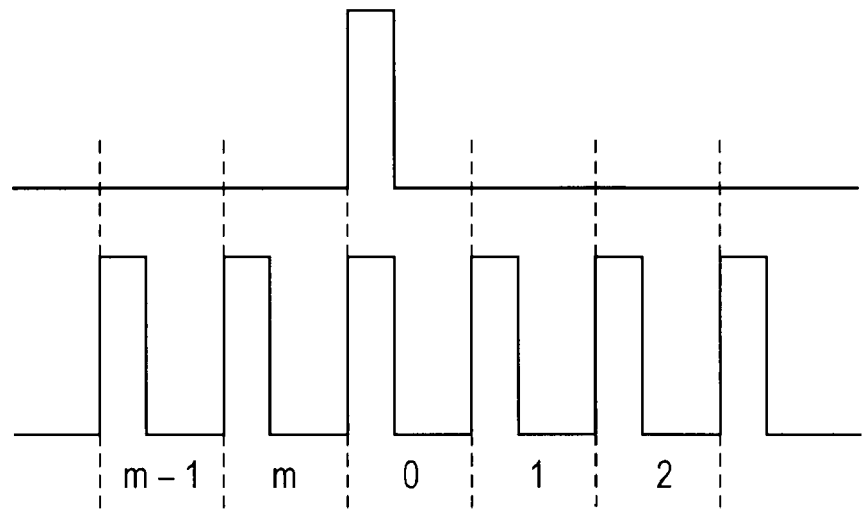
FIG. 11A
Z PULSE
FIG. 11B
S PULSE
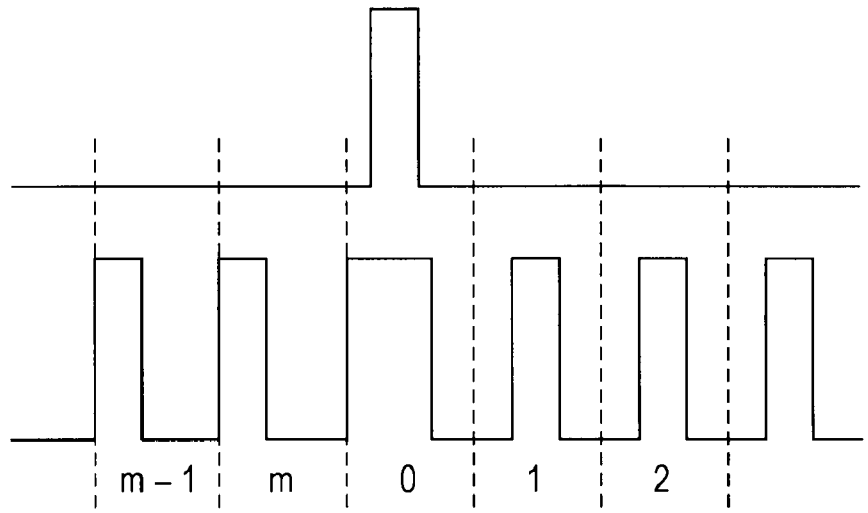
FIG. 12A
Z PULSE
FIG. 12B
S PULSE

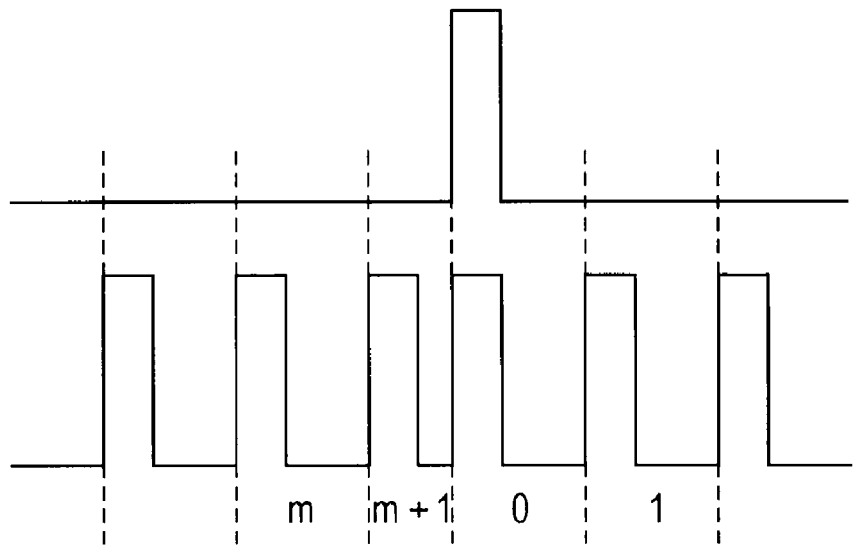
FIG. 13A Z PULSE
FIG. 13B S PULSE

DISK DEVICE AND DISK DRIVE CONTROLLING METHOD

BACKGROUND OF THE INVENTION

1. Field of the Invention

The present invention relates to a disk device configured to record information in and/or reproduce information recorded in a disk medium such as an optical disk or a magneto-optical disk and a disk drive controlling method applied to the disk device and more particularly to a technique used in the case that a disk is rotationally driven to perform servo control.

2. Description of the Related Art

A disk recording device that records information in a disk medium such as an optical disk or a magneto-optical disk and a disk reproducing device that reproduces information recorded in the disk medium as mentioned above include servo systems. For example, each of the above mentioned devices includes an optical pickup unit configured to emit and/or receive laser light with which a signal recording surface of an optical disk is irradiated and hence a mechanism that servo-controls the optical pickup unit may be necessary. Specifically, a focusing servomechanism for a biaxial actuator of the optical pickup unit, a tracking servomechanism and a gap servomechanism for a biaxial actuator of an optical head used in a near field may be necessary.

Incidentally, in the following description, devices configured to record data in and/or reproduce data recorded in a disk-shaped recording medium such as an optical disk by rotationally driving the disk-shaped medium such as the disk recording device and the disk reproducing device of the above mentioned types will be generally referred to as disk devices.

In the case that a voice signal and an image signal recorded using the disk device are to be reproduced, the optical disk is rotated at a high speed, for example, using a spindle motor and the rotation frequency of the spindle motor is accurately controlled using a rotation frequency control circuit. Upon high-speed rotation of the spindle motor, accurate detection of a pit will be necessary even when slight positional displacement is observed in a pit array or a substrate surface is slightly deflected. Therefore, a control system of a disk device includes a servo control unit that repetitively performs highly accurate control processing on, for example, a focusing operation and a tracking operation.

The servo control unit is configured to control operations by paying attention to the fact that, in the case that input signals of almost the same waveform are repetitively input into a control system, the input signal is of the type having a repetitive waveform and by reflecting ever occurred control errors in the currently performed control every time the input signal is repetitively input.

Upon sampling a target signal, an existing servo control device samples the target signal with a sampling signal which is in synchronization with rotation of an optical disk. In general, an output signal sent from an encoder installed in a spindle motor or obtained from a clock pulse recorded in a disk is used as the sampling signal. The output signal is in the form of N (N is an integer) pulses generated for one rotation in synchronization with rotation of the spindle motor or the disk and N sampling signal are obtained by using the output signal.

Incidentally, in the case that an encoder is not mounted on a spindle motor or it is difficult to reproduce a clock pulse from a signal recorded in a disk, a pulse signal has been typically generated on a one wave-for-one disk rotation basis from a control signal of a Hall element used to control the spindle motor. Typically, a PLL (Phase-locked loop) circuit has been configured by using the one wave-for-one rotation pulse signal as a basic clock signal so as to obtain a sampling signal of N pulses for one rotation generated in synchronization with the rotation of a disk. Generation of a one-wave pulse signal for one rotation of a disk may be relatively readily realized by attaching a Hall element to a spindle motor used.

Japanese Laid-open Patent Publication No. 2006-313589 describes an example of a configuration of a disk device to which the above mentioned servo system that performs the above mentioned repetitive servo control is applied.

SUMMARY OF THE INVENTION

The sampling signal of N pulses for one rotation necessary for repetitive servo control may be obtained by obtaining the one wave-for-one disk rotation pulse signal and configuring the PLL circuit that operates in synchronization with the obtained pulse signal as described above. However, the configuration of the PLL circuit is relatively complicated and in some cases it is difficult to install the PLL circuit. In particular, recently, the rotational speed of a disk has been more and more increased as the density at which signals are recorded in a disk is increased, so that a PLL circuit of the type which is phase-locked to an extremely high frequency may be necessary and hence in many cases, it is difficult to install the PLL circuit.

Next, problems that may occur in the case that it is difficult to use a PLL circuit will be described with reference to FIGS. 10 to 13.

First, FIGS. 10A, 10B and 10C illustrate situations in which a jitter is generated in a Z pulse which is a pulse signal output on a one wave-for-one disk rotation basis. In the case that the Z pulse is in synchronization with the original rotational frequency $f_{rot}$ (Hz) of a disk used, the Z pulse is generated in a correct cycle and any jitter does not occur as illustrated in FIG. 10A.

On the other hand, when a jitter occurs in a negative direction, the next Z pulse is generated at a timing earlier than the original Z pulse generation timing as illustrated in FIG. 10B. When a jitter occurs in a positive direction, the next Z pulse is generated at a timing later than the original Z pulse generation timing as illustrated in FIG. 10C.

FIG. 11 illustrates relation between one Z pulse (FIG. 11A) which is a pulse signal output on a one wave-for-one disk rotation basis and S pulses (FIG. 11B) constituted by (m+1) pulse signals generated in one cycle in which one Z pulse is generated.

FIG. 11 illustrates a state in which the Z pulse and the S pulses are generated at their ideal timings with no rotational jitter (wow flutter) in a spindle motor. That is, the S pulse of the 0-th wave is generated at the Z pulse generation timing and then the S pulses of the 1-st wave, the 2-nd wave and so on are generated sequentially at regular intervals. Then, immediately before the next Z pulse is generated, the S pulse of the m-th wave is generated and the timing at which the next S pulse of the 0-th wave is generated coincides with the next Z pulse generation timing in a state in which the S pulse generation intervals are maintained regular.

In the ideal situation with no rotational jitter as described above, favorable repetitive servo control is performed using the generated S pulses.

However, if a rotational jitter is included in rotation of a spindle motor and the Z pulse generation timing is delayed under the influence of the jitter, the S pulses will be generated discontinuously or irregularly.

For example, the pulse width of the S pulse of the 0-th wave may be increased as illustrated in FIG. 12B because the Z pulse generation timing has been slightly delayed from its original generation timing as illustrated in FIG. 12A. The situation illustrated in FIGS. 12A and 12B occurs when a delay of the Z pulse generation timing due to the jitter is shorter than a time period for which the S pulse is rising.

FIGS. 13A and 13B illustrate examples in which the delay of the Z pulse generation timing due to the jitter is longer than the time period for which the S pulse is rising. In the above mentioned case, the S pulse of the (m+1)-th wave is generated following the S pulse of the m-th wave as illustrated in FIG. 13B because the Z pulse generation timing has been delayed as illustrated in FIG. 13A. Then, after the S pulse of the (m+1)-th wave has been generated, intervals at which pulses are generated are made irregular and the S pulse of the 0-th wave is generated.

Although the cases in which the jitter has occurred in the positive direction to make the cycle longer have been described with reference to FIGS. 12A and 12B and FIGS. 13A and 13B, the S pulses are irregularly generated also in the case that a jitter has occurred in a negative direction to make the cycle shorter. In the case that the jitter has occurred in the negative direction, the number of waves of the S pulses may be reduced in some cases.

Disordered or irregular generation of the sampling pulses as mentioned above may induce unstable operations performed for servo control. That is, it sometimes occurs that the number of sampling clock pulses generated for one rotation of a disk concerned becomes more than or less than a specified value to induce skipping of data read out of a memory and a timing lag. As a result, the operations may become unstable in hardware.

The present invention has been made in view of the above mentioned circumstances. It is desirable to realize stable execution of repetitive servo control using a simple configuration without using an encoder and a PLL circuit which operate in synchronization with rotation of a disk in the case that the operation of a disk device is to be servo-controlled.

An embodiment of the present invention is applicable to a process configuration that performs repetitive servo control on a controlled object which will become necessary incidentally to data recording in a disk medium and/or reproduction of data recorded in the disk medium.

The process configuration performs the repetitive servo control by performing main control processing that controls the operation of a controlled object and repetitive control processing that samples an error signal to obtain a repetitive signal component.

In the main control processing, the operation of the controlled object is controlled on the basis of the error signal calculated from a target signal of the controlled object which will become necessary incidentally to data recording in a disk medium and/or reproduction of data recorded in the disk medium and an observation signal obtained by observing the controlled object.

In the repetitive control processing, the error signal is sampled with a sampling clock pulse to obtain the repetitive signal component which is generated in synchronization with rotation of the disk medium from the sampled error signal.

The process configuration also performs sampling clock generation processing to generate the sampling clock pulse used to sample the error signal and reset a timing at which the sampling clock pulse is generated with a rotation detecting pulse obtained by detecting rotation of the disk medium and sampling clock limit processing to limit generation of the sampling clock pulse at a timing immediately before the rotation detecting pulse is generated.

Owing to the above mentioned configuration, the number of sampling clock pulses generated on the basis of the rotation detection pulse will be made constant for one rotation of a disk concerned even if a jitter occurs in rotation of the disk.

According to embodiments of the present invention, the number of sampling clock pulses which are generated for repetitive servo control may be made constant for one rotation of a disk concerned. Therefore, even if a jitter occurs in rotation of the disk, it may become possible to eliminate factors for instability in repetitive servo control induced by a change in the number of sampling clock pulses generated for one rotation of the disk and favorable servo control may be realized.

BRIEF DESCRIPTION OF THE DRAWINGS

FIG. 10A is a timing chart illustrating an example in which a jitter does not occur in rotation of a disk;

FIG. 10B is a timing chart illustrating an example in which one jitter has occurred in rotation of a disk;

FIG. 10C is a timing chart illustrating an example in which another jitter has occurred in rotation of a disk;

FIG. 11A is a timing chart illustrating an example of a rotation pulse (Z pulse) which is ideal in phase relation with a sampling pulse;

FIG. 11B is a timing chart illustrating an example of the sampling pulse (S pulse) which is ideal in phase relation with the rotation pulse;

FIG. 12A is a timing chart illustrating an example in which a rotation pulse has been generated in a jitter-occurred state;

FIG. 12B is a timing chart illustrating an example in which the pulse width of one sampling pulse has been changed due to occurrence of the jitter;

FIG. 13A is a timing chart illustrating an example in which a rotation pulse has been generated in a jitter-occurred state; and FIG. 13B is a timing chart illustrating an example in which the number of sampling pulses generated has been changed due to occurrence of the jitter.

DESCRIPTION OF THE PREFERRED EMBODIMENTS

Next, preferred embodiments of the present invention will be described in the following order.

Figure 1:
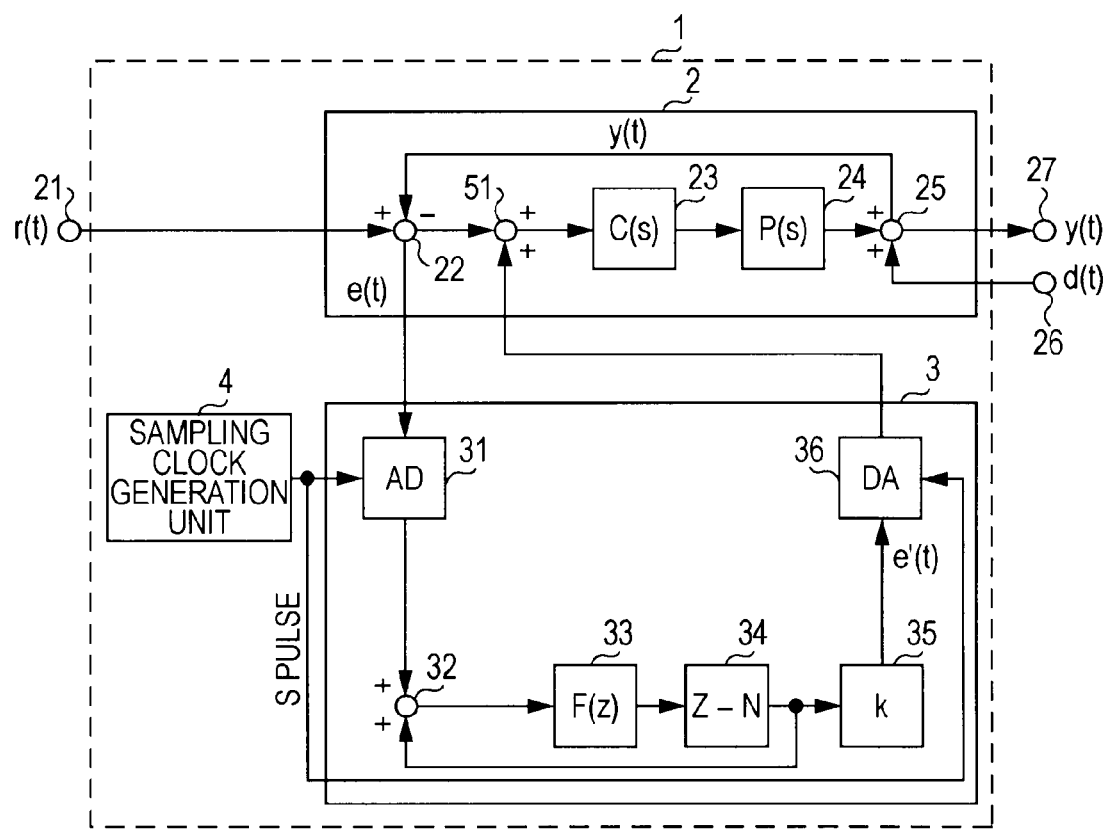
FIG. 1 is a block diagram illustrating one example of a general configuration of a servo control unit according to an embodiment of the present invention.
Figure 2:
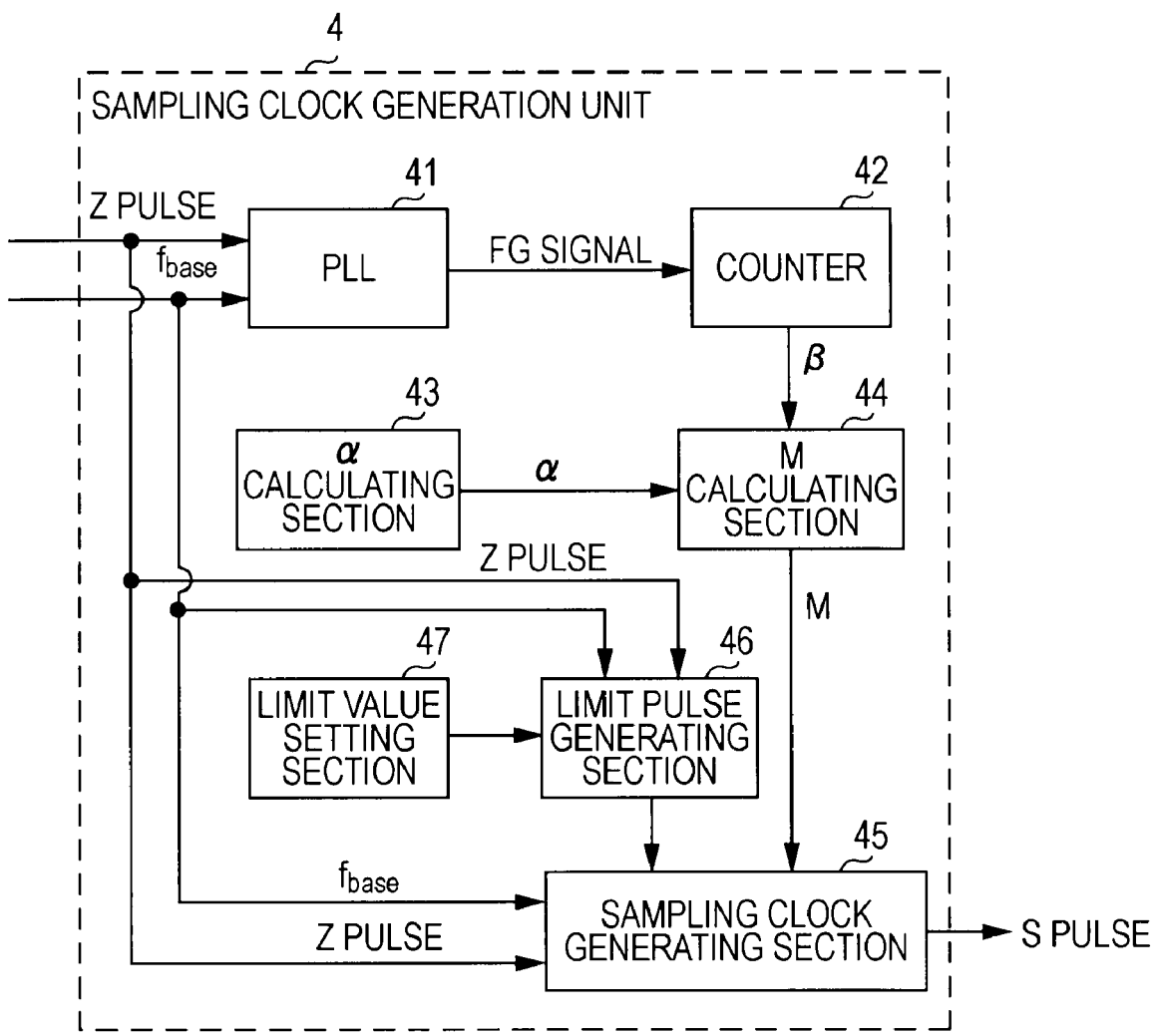
FIG. 2 is a block diagram illustrating an example of a configuration of a sampling clock generation unit according to an embodiment of the present invention.
Figure 3:
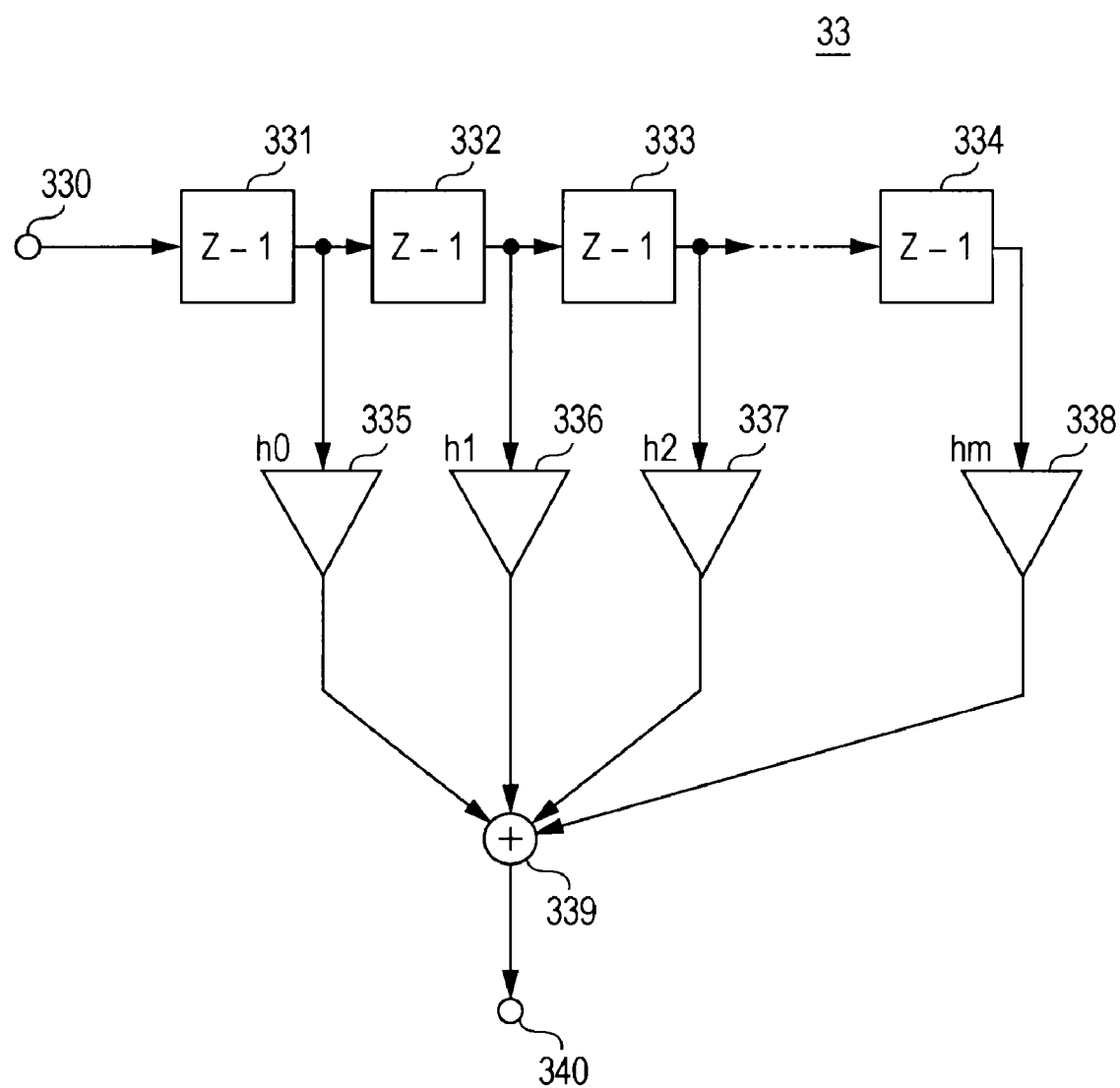
FIG. 3 is a configurational diagram illustrating an example of an adaptive filter according to an embodiment of the present invention.
Figure 4:
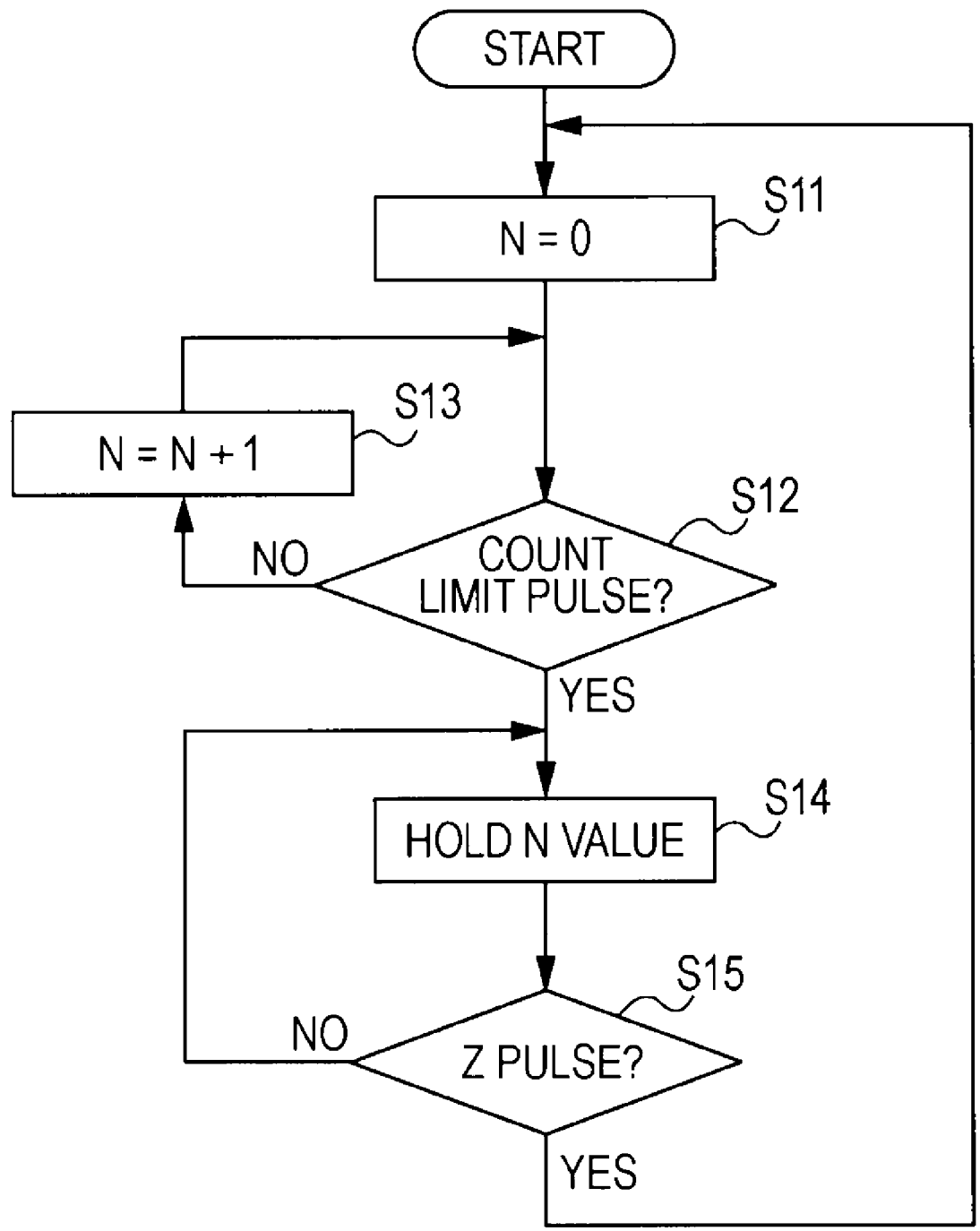
FIG. 4 is a flowchart illustrating an example of a sampling pulse generating process according to an embodiment of the present invention.
Figure 5:
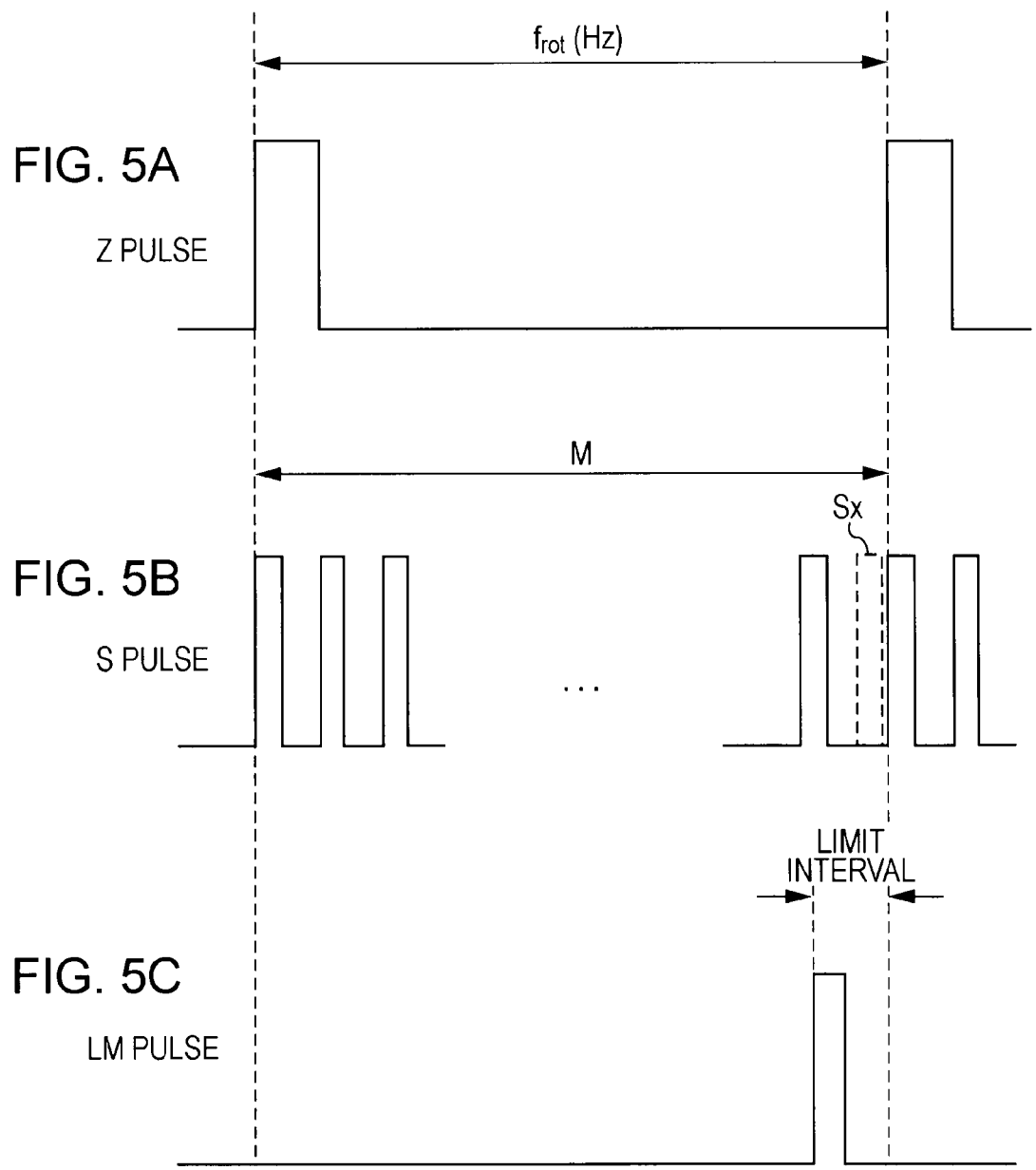
FIG. 5A is a timing chart illustrating one example of a sampling pulse generation timing according to an embodiment of the present invention.
FIG. 5B is a timing chart illustrating another example of the sampling pulse generation timing according to the embodiment of the present invention.
FIG. 5C is a timing chart illustrating a further example of the sampling pulse generation timing according to the embodiment of the present invention.
Figure 6:
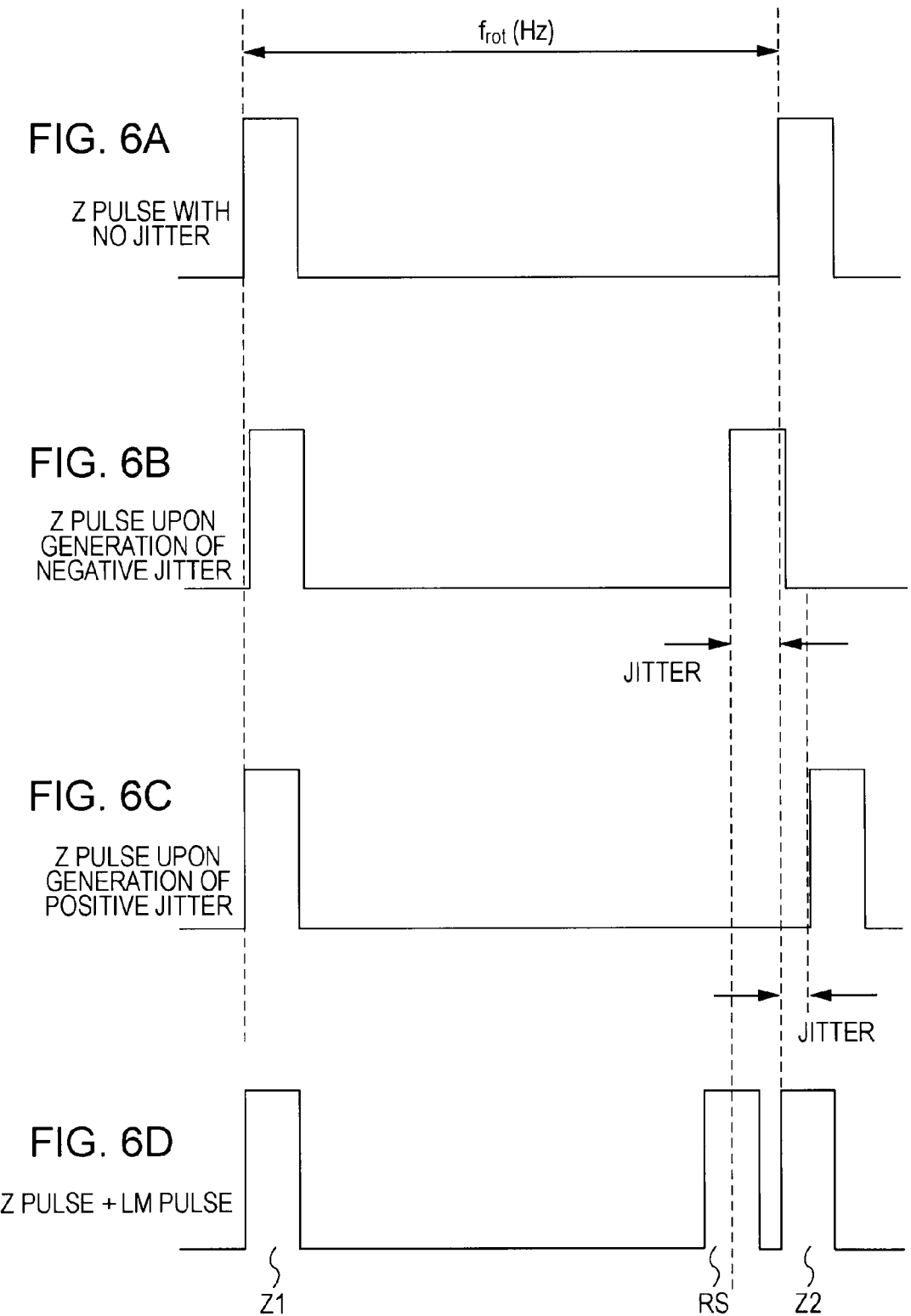
FIG. 6A is a timing chart illustrating one example of setting a limit pulse generation timing according to an embodiment of the present invention.
FIG. 6B is a timing chart illustrating another example of setting the limit pulse generation timing according to the embodiment of the present invention.
FIG. 6C is a timing chart illustrating a further example of setting the limit pulse generation timing according to the embodiment of the present invention.
FIG. 6D is a timing chart illustrating a still further example of setting the limit pulse generation timing according to the embodiment of the present invention.

1. General configuration of a servo control unit: FIGS. 1 and 3
2. Configuration of a sampling clock generation unit: FIG. 2
3. Sampling pulse generating process: FIGS. 4 to 6
4. Modified or altered examples of the configuration of the servo control unit: FIGS. 7 to 9
5. Description of modified or altered examples of sampling clock generation.

[1. General Configuration of a Servo Control Unit]

The servo control unit according to an embodiment of the present invention will be described with reference to FIGS. 1 to 7.

The servo control unit according to an embodiment of the present invention is a servo control unit of the type used in disk devices, for example, such as a disk recording device that records information in a disk medium such as an optical disk or a magneto-optical disk and a disk reproducing device that reproduces information recorded in a disk.

The servo control unit according to an embodiment of the present invention is applied to a focusing servo system or servomechanism for a biaxial actuator of an optical pickup unit, a tracking servo system or servomechanism, or a gap servo system or servomechanism for a biaxial actuator of an optical pickup unit or an optical head used in a near field.

Although specific examples of the above mentioned controlled objects will not be particularly given, already developed or proposed various mechanisms that drive optical pickup units for use in disk devices may be applicable.

FIG. 1 is a diagram illustrating a configuration of a servo control unit according to an embodiment of the present invention.

A servo control unit 1 includes a main servo loop 2 configured to control the operation of a controlled object on the basis of an error signal which has been calculated from a target signal and an observation signal obtained by observing the controlled object, a repetitive control circuit 3 configured to sample the error signal and obtain a repetitive signal component which is in synchronization with rotation of an optical disk from the sampled error signal and a sampling clock generation unit 4 configured to generate a sampling clock pulse used for sampling the error signal. The configuration of the sampling clock generation unit 4 will be described later.

In the servo control unit 1, the repetitive control circuit 3 extracts a signal component which is repeated in synchronization with rotation of the optical disk from the error signal using a low-pass filter and holds the extracted signal component in a memory for storing data of one rotation. The circuit reads out the signal component held in the memory, adjusts its amplitude using a predetermined coefficient "k" and then feeds forward the signal component so amplitude-adjusted to the main servo loop 2. The main servo loop 2 suppresses an error signal including a repetitive component which is not removed with the signal from the repetitive control circuit 3 by feeding back it to a preceding stage.

A target signal r(t) is input into the main servo loop 2 via an input terminal 21 and a disturbance signal d(t) is input into the loop via an input terminal 26, and the main servo loop 2 outputs an observation signal y(t) via an output terminal 27.

The target signal r(t) is at a fixed value in a disk device and is normally set to zero. The disturbance signal d(t) is generated corresponding to, for example, changes in surface level in the focusing servo system and eccentricity in the tracking servo system. The observation signal y(t) corresponds, for example, to a focusing error signal or a tracking error signal detected using a photo-detector of the optical pickup unit in the disk device.

The target signal r(t) which has been input via the input terminal 21 is supplied to a subtracter 22. The observation signal y(t) is also supplied from an adder 25 which will be described later to the subtracter 22. The subtracter 22 subtracts the observation signal y(t) from the target signal r(t), outputs a first error signal e(t) obtained from a subtraction (r(t)−y(t)) and supplies the error signal to the repetitive control circuit 3. The first error signal e(t) is also supplied to an adder 51.

The repetitive control circuit 3 takes a second error signal constituted by a rotation synchronous signal out of the first error signal e(t) and outputs a third error signal obtained by sequentially updating the first error signal while saving the second error signal in a memory having a capacity of one cycle. Repetitive control of the servo error signal (observation signal) is implemented by performing the above mentioned processing.

When the first error signal e(t) is supplied from the main servo loop 2, an A/D (analog to digital) conversion circuit 31 converts the first error signal e(t) of an analog form to a digital signal and supplies the digital signal to an adder 32. The sampling clock pulse (S pulse) used for analog-to-digital conversion performed using the A/D conversion circuit 31 is supplied from the sampling clock generation unit 4. In addition, a feedback component which will be described later is also supplied to the adder 32. The adder 32 supplies the first error signal e(t) to an adaptive filter (F(z)) 33 as an addition output.

As the adaptive filter (F(z)) 33, for example, an FIR (Finite Impulse Response) filter may be applicable. The FIR filter has linear phase characteristics and hence stability may be guaranteed by using the FIR filter.

FIG. 3 is a diagram illustrating a configurational example of the adaptive filter (F(z)) 33 constituted by the FIR filter.

In the adaptive filter (F(z)) 33, the first error signal e(t) supplied via an input terminal 330 is delayed for a delay time m=1 using a delay unit (Z−1) 331 and then is supplied to a multiplier 335 of a coefficient h0 as illustrated in FIG. 3. A delay unit (Z−1) 332 delays the first error signal e(t) which has been delayed using the delay unit (Z−1) 331 also for the delay time m=1 and then supplies the delayed first error signal to a multiplier 336 of a coefficient h1. A delay unit (Z−1) 333 delays the first error signal e(t) which has been delayed using the delay unit (Z−1) 332 also for the delay time m=1 and then supplies the delayed first error signal to a multiplier 337 of a coefficient h2. Then, an output which has been delayed using delay units (Z−1) at subsequent stages not illustrated in the drawing and simply indicated by broken lines is supplied to a delay unit (Z−1) 334 at the final stage, is delayed for the delay time m=1 and is then supplied to a multiplier 338 of a coefficient hm.

The multipliers 335, 336, 337, . . . and the multiplier 338 respectively multiply outputs which have been delayed using the delay units 331, 332, 333, . . . and the delay unit 334 and the predetermined coefficients h0, h1, h2, . . . and hm.

Outputs from the multipliers 335, 336, 337, . . . and the multiplier 338 are added together using an adder 339 and are output as a second error signal e(n) via an output terminal 340.

A delay unit (Z−N) 34 delays the second error signal e(n) which has been output from the adaptive filter (F(z)) 33 for a time taken for one rotation of an optical disk and saves the delayed signal in a memory. Then, the delay unit (Z−N) 34 feeds back the second error signal which has been delayed for the time taken for one rotation of the disk and is saved in the memory to the adder 32 and supplies the signal to a coefficient multiplier 35 simultaneously.

The coefficient multiplier 35 multiplies a predetermined coefficient k and the second error signal to generate a third error signal e'(t) and supplies the generated third error signal to a D/A (digital to analog) conversion circuit 36.

The D/A conversion circuit 36 converts the third error signal e'(t) of a digital form to an analog signal. The sampling clock pulse (S pulse) is supplied from the sampling clock generation unit 4 also to the D/A conversion circuit 36 and the conversion circuit 36 converts the digital signal to the analog signal in synchronization with the supplied clock pulse.

The analog signal so converted is added to the first error signal e(t) using an adder 51 installed in the main servo loop 2. The signal added using the adder 51 is fed forward to a controller (C(s)) 23.

The controller C(s)) 23 is connected to a controlled object (P(s)) 24. The controlled object (P(s)) 24 corresponds to a biaxial actuator installed in the disk device. An output from the controlled object (P(s)) 24 is supplied to the adder 25. The adder 25 adds the output from the controlled object (P(s)) 24 to the disturbance signal d(t) input via the input terminal 26 to output the observation signal y(t) via the output terminal 27 and to feed back the observation signal y(t) to the subtracter 22 simultaneously.

[2. Configuration of the Sampling Clock Generation Unit]

Next, the configuration of the sampling clock generation unit 4 will be described with reference to FIG. 2.

In the servo control unit 1 according to an embodiment of the present invention, the sampling clock generation unit 4 is configured to generate a sampling clock pulse having a sampling frequency corresponding to the rotational frequency of the disk and supply the sampling clock pulse to the repetitive control circuit 3.

As illustrated in FIG. 2, the sampling clock generation unit 4 includes a PLL (Phase Locked Loop) circuit 41, a counter 42, an α calculating section 43, an M calculating section 44 and a sampling clock generating section 45. It also includes a limit pulse generating section 46 and a limit value setting section 47. The limit pulse generating section 46 generates a limit pulse (LM pulse) at a timing set on the basis of a set value which has been stored in the limit value setting section 47. The generated limit pulse is supplied to the sampling clock generating section 45. When the limit pulse is supplied, the sampling clock generating section 45 stops generation of sampling clock pulses until the next rotation detecting pulse (Z pulse) is supplied thereto.

The rotation detecting pulse (Z pulse) is supplied from a rotation control mechanism (not illustrated in the drawing) of an optical disk installed in the disk device to the PLL circuit 41. The Z pulse is generated on the basis of an output from a Hall element attached to, for example, a spindle motor (not illustrated in the drawing) that rotationally drives the disk and is generated on a one pulse-for-one rotation basis in synchronization with a rotation detecting frequency $f_{rot}$. In the case that a plurality of Hall elements are provided, a pulse thinning process is performed such that one pulse is generated for one rotation and the generated pulse is supplied to the PLL circuit 41. A pulse generated at a reference frequency $f_{base}$ which is sufficiently higher than the frequency of the Z pulse is also supplied to the PLL circuit 41.

When the Z pulse generated in synchronization with the reference frequency $f_{base}$ of the device are supplied to the PLL circuit 41, the PLL circuit 41 makes a rotation detecting frequency $f_s$ synchronous with the reference frequency $f_{base}$. As an alternative, a latch circuit (not illustrated in the drawing) may be installed in place of the PLL circuit 41. The PLL circuit 41 operates to fix the rotation detecting frequency $f_s$ to make the reference frequency $f_{base}$ synchronous with the rotation detecting frequency $f_{rot}$. On the other hand, the latch circuit operates to fix the reference frequency $f_{base}$ to make the rotation detecting frequency $f_{rot}$ synchronous with the reference frequency $f_{base}$.

The counter 42 counts the number of pulses having the reference frequency $f_{base}$ between pulses having the rotation detecting frequency $f_s$ to calculate a count number β and supplies the calculated count number β to the M calculating section 44. The count number β is calculated from the following equation (1).

$$\beta = f_{base}/f_{rot} \quad (1)$$

The α calculating section 43 calculates a constant α from the following equation (2) using the reference frequency $f_{base}$ and a frequency $f_s'$ of a target sampling clock pulse which has been set in advance.

$$\alpha = f_{base}/f_s' \quad (2)$$

The M calculating section 44 calculates a parameter M used to divide an interval between rotation detecting pulses into equal sections from an equation M=β/α using the constant α and the count number β.

The sampling clock generating section 45 generates sampling clock pulses (S pulses) which are output at equal intervals obtained by dividing the interval between the rotation detecting pulses (Z pulses) into equal sections using the parameter M. The S pulses are generated using the reference frequency $f_{base}$.

In the example illustrated in FIG. 2, the sampling clock generation unit 4 includes the limit pulse generating section and the limit value setting section 47 so as to be configured such that generation of the sampling clock signals is limited with a limit pulse output from the limit pulse generating section 46. Specifically, it is configured such that output of the sampling clock signals (S pulse) is stopped for a time period from when the limit pulse (LM pulse) has been output to when the next Z pulse is supplied.

The limit value setting section 47 stores therein information on a limit pulse generating timing and the limit pulse generating section 46 outputs the limit pulse on the basis of the information stored in the limit value setting section 47. The information on the limit pulse generating timing is stored in the limit value setting section concerned, for example, in the course of an adjusting work performed upon manufacture of a disk device. In the adjusting work, a jitter in each spindle motor that rotates each disk is measured and data indicative of a time period for which the Z pulse generating cycle is the most shortened in the measured jitters or a time period which is slightly shorter than the time period for which the Z pulse generating cycle is the most shortened is stored. Then, the limit pulse generating section 46 outputs the limit pulse after the time period which has been stored in the limit pulse setting section 47 has elapsed after the Z pulse has been supplied. The number of sampling clock pulses generated in a cycle of one rotation of the disk is limited to a constant value by outputting the limit pulse to limit generation of the clock pulses in the above mentioned manner. A specific controlling example using the limit pulse will be described later.

[3. Sampling Pulse Generating Process]

Next, a process to be executed when sampling pulses are generated using the sampling clock generation section 4 will be described with reference to FIGS. 4 to 6.

FIG. 4 is a flowchart illustrating a state of processing executed within the sampling clock generating section 45 illustrated in FIG. 2 when the sampling pulse is to be generated.

Description will be made following the flowchart illustrated in FIG. 4. First, the value N of a built-in counter is reset to "0" in an initial state corresponding to a timing at which the Z pulse concerned has been supplied and one sampling pulse is output (step S11). Then, whether a limit pulse has been supplied from the limit pulse generating section 46 is judged (step S12). When it is judged that the limit pulse has not been supplied, a sampling pulse is output at the next Z pulse supplying timing and "1" is added to the value N of the built-in counter to update the value (step S13). After the value of the built-in counter has been updated, the process returns to step S12 for judgment.

When it is judged that the limit pulse has been supplied at step S12, the count value N is held as it is (step S14) to stop output of the sampling pulse even when a timing at which the next sampling pulse is to be output has come. In this state, whether the Z pulse is supplied is judged (step S15) and the process is put on standby until the Z pulse is supplied.

When it is detected that the Z pulse has been supplied at step S15, the process returns to step S11 to output again sampling pulses starting from the timing at which the Z pulse concerned has been supplied.

The above described processing illustrated in the flowchart in FIG. 4 is repeated in each Z pulse generating cycle.

Next, states of processes of outputting the pulses which have been generated in the above mentioned manner will be described with reference to timing charts illustrated in FIGS. 5 and 6.

FIGS. 5A, 5B and 5C are diagrams illustrating states in which respective pulses are output according to an embodiment of the present invention.

It is assumed that the Z pulses which are in synchronization with the disk rotation detecting frequency $f_{rot}$ are supplied as illustrated in FIGS. 5A and S pulses or the sampling clock pulses generated on the basis of generation of the Z pulses are obtained as illustrated in FIG. 5B. The S pulses are originally set such that M (number) pulses are output in one cycle in which one Z pulse is generated. Incidentally, the Z pulse generating cycle illustrated in FIG. 5A indicates a cycle obtained in a state in which a small jitter has occurred in a negative direction.

According to an embodiment of the present invention, such a configuration is adopted that one limit pulse (the LM pulse) is output slightly earlier than a timing at which the Z pulse is to be originally output as illustrated in FIG. 5C. Owing to output of the LM pulse illustrated in FIG. 5C, an interval which is left until another Z pulse (FIG. 5A) is supplied next is set as a limit interval for which limitation is made so as not to output any S pulse. In a state illustrated in FIG. 5B, a pulse Sx which is to be originally output when no limitation is made is limited so as not to be output.

The limitation is released simultaneously with supply of the next Z pulse and output of the S pulses is started again as illustrated in 5B.

The processes illustrated in FIGS. 5A to 5C are repeated per cycle in which each Z pulse is supplied.

FIGS. 6A, 6B, 6C and 6D are diagrams illustrating limit pulse outputting timing setting examples according to an embodiment of the present invention.

As described above, the limit pulse which is generated to temporarily stop output of the S pulse or the sampling clock pulse is set as a value stored in the limit value setting section 47 on the basis of a jitter occurred when the disk is driven using the spindle motor of the disk device. That is, the Z pulse generating cycle in which the jitter occurred in the negative direction when the disk is driven is minimized is measured and a time period of the measured cycle is set as the value to be stored in the limit value setting section 47.

Specifically, it is assumed that FIG. 6A illustrates a state in which the ideal disk rotation detecting frequency $f_{rot}$ at which any jitter does not occur has been obtained, FIG. 6B illustrates a state in which the jitter which has occurred in the negative direction in the same disk device as the above is maximized and the interval between the Z pulses is reduced and FIG. 6C illustrates a state in which the jitter which has occurred in the positive direction in the same disk device as the above is maximized and the interval between the Z pulses is increased.

In the examples illustrated in the drawings, it is also assumed that the maximized jitter is a maximum jitter which occurs due to irregular or unstable rotation of the disk when measured, for example, in a state in which the disk device stands still and any vibration is not exerted onto the device from the outside. As an alternative, in the case that the disk device is of the portable or vehicle-mounted type such as a device onto which vibration is exerted in a normally used state, the jitter may be measured by taking the vibration exerted onto the device into consideration.

In the case that the negatively maximized jitter illustrated in FIG. 6B has been measured, the timing at which a reset pulse is output is set to be the same as the Z pulse output timing obtained at least in the case that the maximum jitter has occurred in the negative direction or set such that it comes slightly earlier than the Z pulse output timing obtained in the case that the maximum jitter has occurred in the negative direction.

FIG. 6D illustrates an example in which pulse output timings have been set by taking the above mentioned situations into consideration. In the example illustrated in FIG. 6D, the Z pulse and the limit pulse are illustrated on the same time axis. When a time period which is slightly shorter than a time period corresponding to the interval between the Z pulses obtained upon occurrence of the maximum jitter in the negative direction has elapsed from a timing at which the previous Z pulse (Z1) has been output, the limit pulse (LM 1) is output. A time period from when the limit pulse (LM 1) has been output to a timing at which the next Z pulse (Z2) is output is set as a time period for which output of the sampling pulse (S pulse) is limited.

In the example illustrated in FIG. 6D, the time period which is slightly shorter than the time period corresponding to the interval between the Z pulses obtained upon occurrence of the maximum jitter in the negative direction has been set. As an alternative, the timing may be set such that a limit pulse is output when the time period corresponding to the interval between the Z pulses obtained upon occurrence of the maximum jitter in the negative direction has elapsed.

The sampling clock pulses may be prevented from being irregularly generated under the influence of occurrence of the jitter, by limiting output of the sampling clock pulse for a time period from when the limit pulse has been output to when a pulse which is to be generated corresponding to one rotation cycle of the disk is output. That is, such a problem may not occur that one sampling pulse overlaps the other sampling pulse to increase the pulse width as illustrated in FIG. 12 or the number of sampling pulses is increased beyond the originally set number as illustrated in FIG. 13 as described in the column of the Description of the Related Art.

According to an embodiment of the present invention, the number of sampling clock pulses generated in one rotation cycle of the disk is fixed to a value less than the set value M and the sampling clock pulses of the number which is more than the fixed value may not be output and two sampling clock pulses may not be generated in an overlapped state.

Therefore, neither cyclic irregularity under the influence of a jitter nor a change in the number of sampling clock pulses may occur in a signal which is sampled with the sampling clock pulse. Thus, factors inducing instability in the servo operation may be eliminated to realize favorable servo control of the disk device.

[4. Modified or Altered Examples of the Configuration of the Servo Control Unit]

The servo control unit 1 illustrated in FIG. 1 may be modified or altered in a variety of ways.

Figure 7:
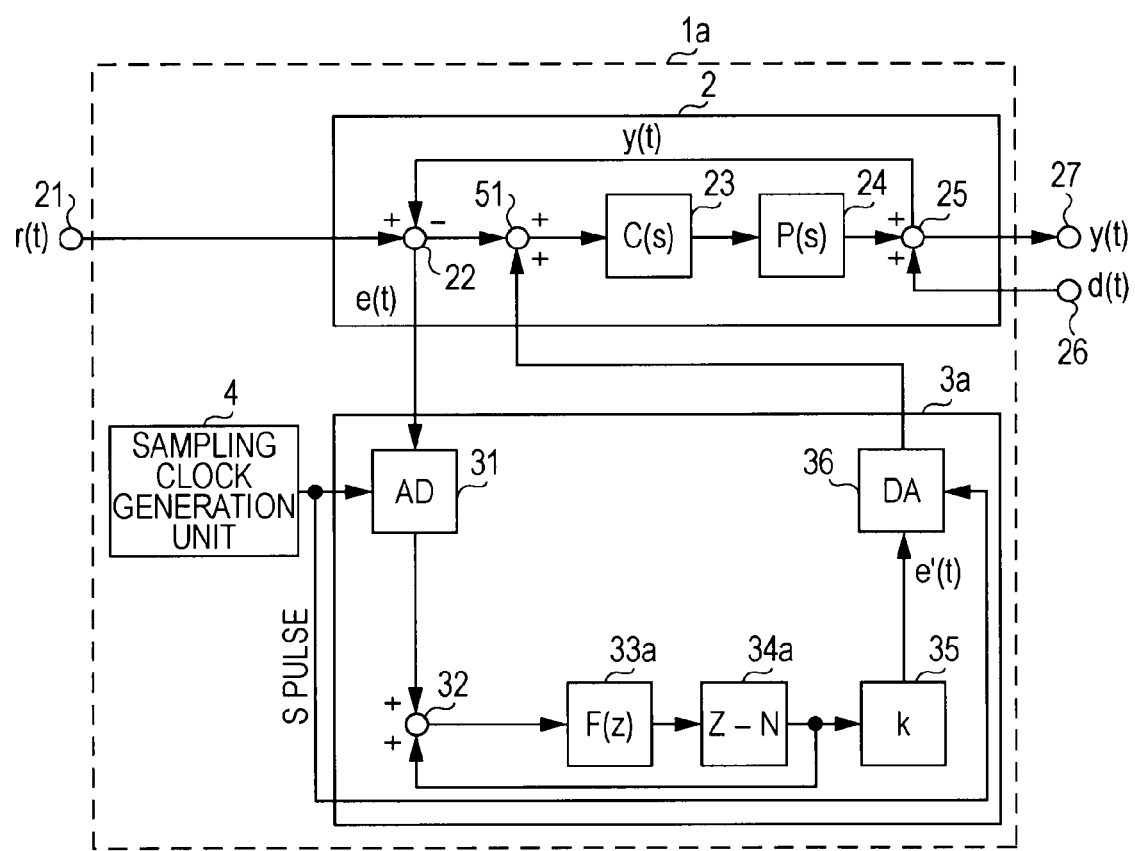
FIG. 7 is a block diagram illustrating another configurational example (an example 2) of the servo control unit according to an embodiment of the present invention.
Figure 8:
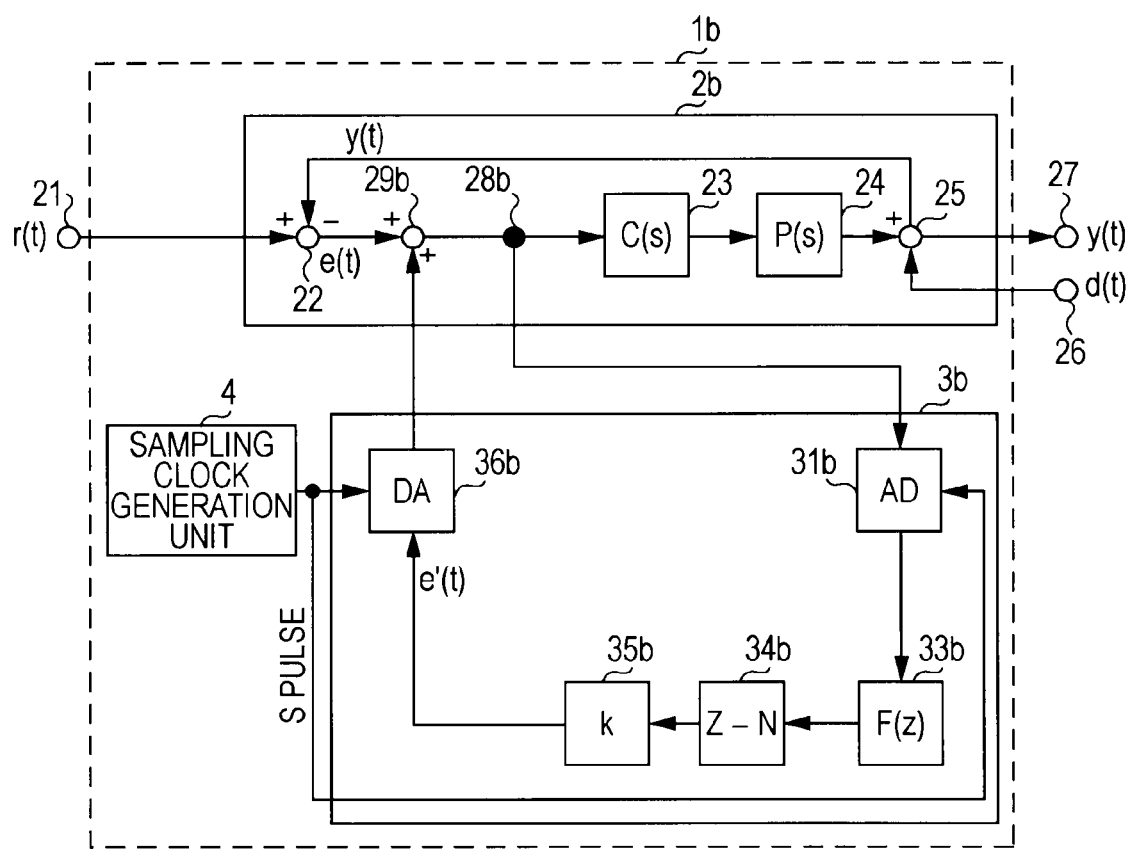
FIG. 8 is a block diagram illustrating a further configurational example (an example 3) of the servo control unit according to an embodiment of the present invention.
Figure 9:
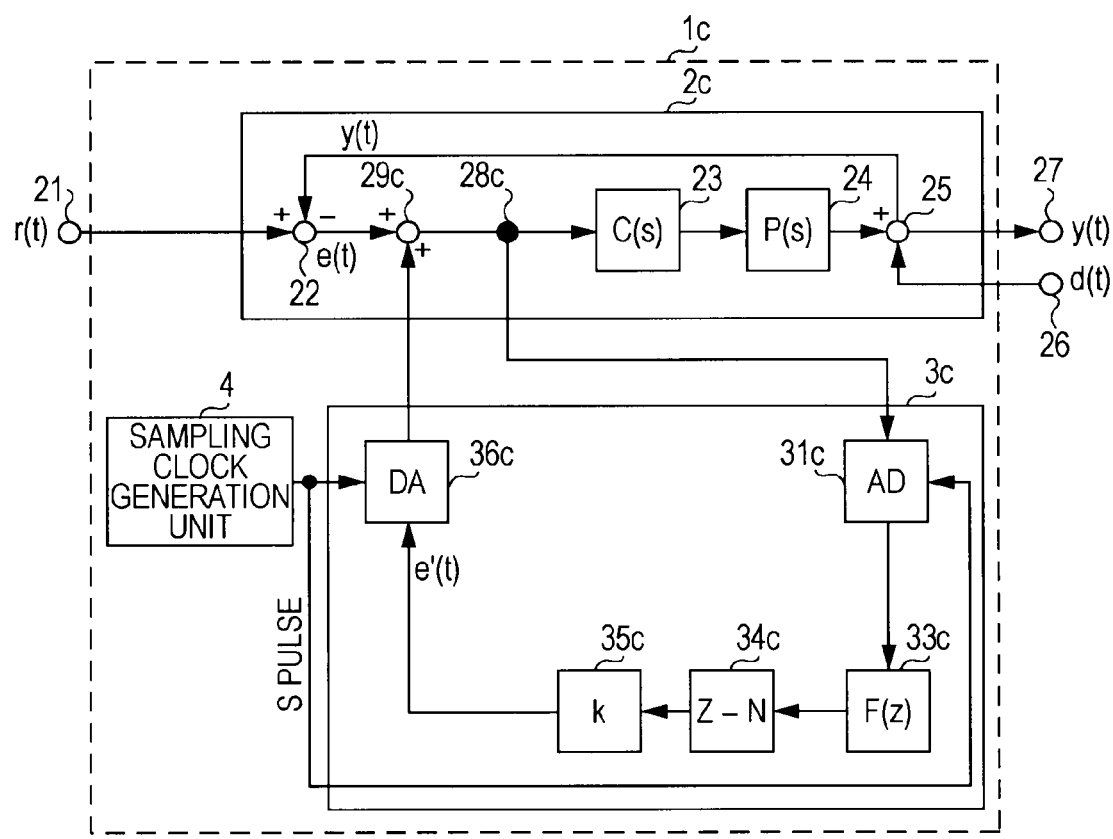
FIG. 9 is a block diagram illustrating a still further configurational example (an example 4) of the servo control unit according to an embodiment of the present invention.

For example, modified or altered examples as illustrated in FIGS. 7 to 9 may be given. Incidentally, in the drawings, the same numerals are assigned to the same constitutional elements as those in FIG. 1 and description thereof will be omitted.

For example, the servo control unit 1 may be modified or altered to constitute a servo control unit 1a illustrated in FIG. 7.

The servo control unit 1a illustrated in FIG. 7 is configured such that a delay unit (Z–N) 34a installed in a repetitive control circuit 3a delays a second error signal e(n) for a time taken for one rotation of an optical disk and saves the delayed signal in a memory. Then, an adaptive filter (F(z)) 33a reads out the second error signal e(n) delayed for the time taken for one rotation of the optical disk from the delay unit (Z–N) 34a to perform the above mentioned filtering process.

In the configuration illustrated in FIG. 7, the S pulse generated from the sampling clock generation unit 4 is supplied to the A/D conversion circuit 31 and the D/A conversion circuit 36. The S pulse is a sampling pulse generation of which has been temporarily limited by execution of the processing illustrated in the flowchart in FIG. 4.

In addition, the servo control unit 1 may be modified or altered to constitute a servo control unit 1b illustrated in FIG. 8.

The servo control unit 1b illustrated in FIG. 8 is configured such that an error signal output via an output terminal 28b of a main servo loop 2b is supplied to an A/D conversion circuit 31b installed in a repetitive control circuit 3b, an output from the A/D conversion circuit 31b is supplied to a D/A conversion circuit 36b via an adaptive filter (F(z)) 33b, a delay unit (Z–N) 34b and a coefficient multiplier 35b, and then an output from the D/A conversion circuit 36b is fed back to an adder 29b of the main servo loop 2b.

In the configuration illustrated in FIG. 8, the S pulse generated from the sampling clock generation unit 4 is supplied to the A/D conversion circuit 31b and the D/A conversion circuit 36b. The S pulse is a sampling pulse generation of which has been temporarily limited by execution of the processing illustrated in the flowchart in FIG. 4.

Further, the servo control unit 1 may be modified or altered to constitute a servo control unit 1c illustrated in FIG. 9.

The servo control unit 1c illustrated in FIG. 9 is configured such that an error signal output via an output terminal 28c of a main servo loop 2c is supplied to an A/D conversion circuit 31c installed in a repetitive control circuit 3c, an output from the A/D conversion circuit 31c is supplied to a D/A conversion circuit 36c via an adaptive filter (F(z)) 33c, a delay unit (Z–N) 34c and a coefficient multiplier 35c, and then an output from the D/A conversion circuit 36c is fed back to an adder 29c of the main servo loop 2c.

In the configuration illustrated in FIG. 9, the S pulse generated from the sampling clock generation unit 4 is supplied to the A/D conversion circuit 31c and the D/A conversion circuit 36c. The S pulse is a sampling pulse generation of which has been temporarily limited by execution of the processing illustrated in the flowchart in FIG. 4.

Favorable servo control of the disk device may be performed using the configurations of the servo control unit illustrated in FIGS. 7 to 9.

[5. Description of Modified or Altered Examples of Sampling Clock Generation]

The above mentioned embodiments of the present invention are configured such that the limit pulse used to limit generation of the sampling clock pulse is generated at the timing set on the basis of the stored value set in the limit value setting section 47 and the stored value set in the limit value setting section 47 is stored in each disk device by measuring a jitter in rotation of each spindle motor in the course of the adjusting work performed upon manufacture of each disk device. As an alternative, in the case that it may be possible to predict in advance the maximum jitter occurring in the negative direction upon rotation of a disk, a time period corresponding to a minimum rotation cycle which may be predicted or a cycle which is slightly shorter than the minimum rotation cycle may be stored in all the disk devices to be manufactured.

In addition, the stored value set in the limit value setting section 47 may be configured to be set by taking time-passing change of a jitter occurring situation of the disk device concerned into consideration.

For example, a situation in which a jitter occurs in rotation of a spindle motor that operates to rotationally drive a disk is automatically measured periodically at certain time intervals. The jitter occurring situation may be measured by setting the measuring time in a variety of ways, for example, every time the time or the date and hour which has been measured using, for example, a timer has elapsed or every time the power source of the disk device is turned on. Then, the minimum rotation cycle is judged from jitters which have been measured periodically or depending on situations and when a change is observed in the minimum rotation cycle, the stored value in the limit value setting section 47 is updated on the basis of the change. In the above mentioned manner, it may become possible to cope with the time-passing change of the jitter occurring situation.

Incidentally, the configurations of the servo control unit illustrated in FIG. 1 and other drawings and the configuration that generates the sampling clock pulse illustrated in FIG. 2 are given merely as favorable examples and the present invention may not be limited to these configurations illustrated in the drawings. As for the configuration that limits generation of the sampling clock pulses, generation of the sampling clock pulses may be limited in the same manner as the above by a limiting process performed using a signal other than the limit pulse described with reference to FIG. 2 as long as it is the configuration that limits generation of the limit pulse on the basis of the principle illustrated in the flowchart in FIG. 4.

The present application contains subject matter related to that disclosed in Japanese Priority Patent Application JP 2008-311641 filed in the Japan Patent Office on Dec. 5, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disk device comprising:
    a main control unit configured to control a controlled object on the basis of an error signal calculated from a target signal of the controlled object which will become necessary incidentally to recording of data in a disk medium and/or reproduction of data recorded in the disk medium and an observation signal of the controlled object;
    a repetitive control unit configured to sample the error signal with a sampling clock pulse to obtain a repetitive signal component which is generated in synchronization with rotation of the disk medium from the sampled error signal;
    a sampling clock generation unit configured to generate the sampling clock pulse used to sample the error signal and reset a timing at which the sampling clock pulse is generated in accordance with a rotation detecting pulse generated when rotation of the disk medium has been detected; and
    a sampling clock limit unit configured to limit generation of the sampling clock pulse at a timing immediately before generation of the rotation detecting pulse.

2. The disk device according to claim 1, wherein
the sampling clock limit unit executes a process of limiting such that the number of sampling clock pulses generated for a unit rotation time period does not change under the influence of a jitter occurring in the rotation detecting pulse generated upon detection of rotation of the disk medium.

3. The disk device according to claim 2, further comprising:
    a storage unit configured to store data indicative of a time period for which a cycle in which the rotation detecting pulse is generated becomes the shortest under the influence of the jitter or a time period which is slightly shorter than the time period, wherein
the sampling clock limit unit limits generation of the sampling clock signal for a time period from a timing at which a limit pulse concerned has been generated to a timing at which the next rotation detecting pulse is generated by generating the limit pulse when the stored time period has elapsed after the sampling clock pulse generation timing has been reset with the rotation detecting pulse.

4. The disk device according to claim 3, wherein
the jitter in rotation of a disk of the disk device concerned is measured in advance to obtain data to be stored in the storage unit.

5. The disk device according to claim 3, wherein
the jitter in rotation of a disk of the disk device concerned is measured periodically or depending on situations and the data stored in the storage unit is updated on the basis of a time period for which the generation cycle of the rotation detection pulse obtained by measuring the jitter is the shortest.

6. A disk drive controlling method comprising the steps of:
performing main control processing that controls the operation of a controlled object on the basis of an error signal calculated from a target signal of the controlled object which will become necessary incidentally to recording of data in a disk medium and/or reproduction of data recorded in the disk medium and an observation signal of the controlled object;
performing repetitive control processing that samples the error signal with a sampling clock pulse to obtain a repetitive signal component which is generated in synchronization with rotation of the disk medium from the sampled error signal;
performing sampling clock generation processing that generates the sampling clock pulse used to sample the error signal and resets a timing at which the sampling clock signal is generated with a rotation detecting pulse generated when rotation of the disk medium has been detected; and
performing sampling clock limit processing that limits generation of the sampling clock signal at a timing immediately before generation of the rotation detecting pulse.

* * * * *